Figure 1:
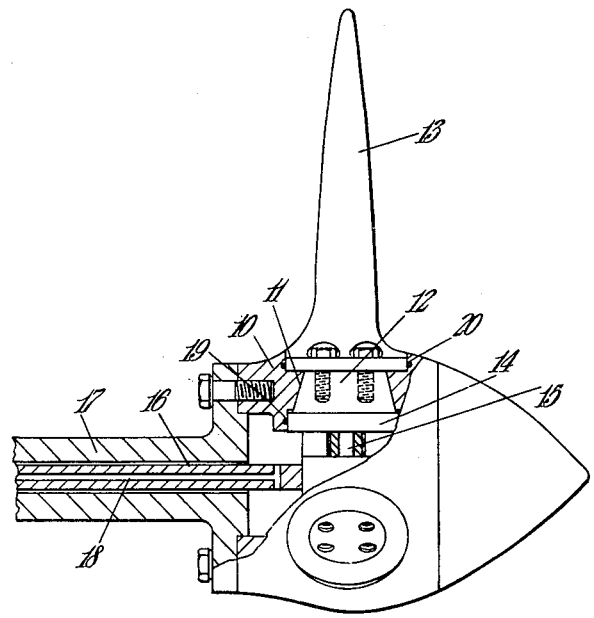

Inventor
T. Hindmarch

United States Patent Office 2,981,338
Patented Apr. 25, 1961

2,981,338
LOCKING DEVICE FOR PROPELLER BLADES
Thomas Hindmarch, Lindo Lodge, Stanley Ave., Chesham, England
Filed Apr. 14, 1958, Ser. No. 728,310
Claims priority, application Great Britain Apr. 15, 1957
7 Claims. (Cl. 170—160.6)

The invention relates to an improvement in controllable pitch propellers whereby the propeller blade may be locked and the load removed from the adjusting mechanism when the propeller is working under load.

It is known to have adjustable ship's propellers in which the blades are positioned and locked in a predetermined position, i.e., in the shipyard; and it is also known to make controllable pitch propellers in which the blades are caused to alter their angle of incidence by rotation about a radial axis. This rotation is caused by an actuating device connected to the blade roots by such known methods as links, cranks, levers or toothed gears.

It is also known to have actuating devices which are self-braking, such as a threaded spindle and nut.

The invention consists in an immobilizing device for the prevention of unintentional rotation or movement of the blades of a controllable pitch propeller comprising a friction brake upon the root of the blade, a friction brake member upon the boss or hub of the propeller co-operating with the brake member upon the root, and fluid pressure operated means for forcing the brake members into braking engagement.

The invention still further consists in a construction as set forth in the preceding paragraph in which the interengaging surfaces of the brake members are conical. The shape of the hull causes variations in the quantity and turbulence in the stream of water passing to the propeller; and this, in turn, causes cyclic variations in the pressure of the blade. Due to the essential working clearance in the blade bearings, this cyclic variation in pressure causes vibration or shudder which results in rapid wear of the blade bearings. The variations in load are passed on by the connecting means to the actuating device, and many examples are known in which rapid wear due to this cause has resulted. Similarly, when the propeller blades strike a submerged object, damage is frequently caused to the blade bearings and actuating device.

It has become the usual practice to so proportion the blade journals and the actuating device that they are capable of withstanding the imposed loads with little wear. This practice inevitably leads to a comparatively large diameter of the propeller boss or hub with the consequent reduction in propulsive efficiency. Where the propeller must work in ice or among submerged objects, it is well known that the hub diameter must be increased still further, and a lower propulsive efficiency accepted.

The provision of an immobilizing device according to the invention overcomes these difficulties in the following manner:

(a) The braking action on the root of the blade relieves the actuating device and connecting means of all load due to cyclic variations in pressure, vibration or shudder and the accidental striking of submerged objects except during the period when adjustment of pitch is actually taking place.

(b) The reduction in the working clearance of the blade bearings in the immobilized state effectively eliminates any tendency to shudder and so reduces the probability of wear.

(c) The conical form of the blade bearings enables wear due to any cause to be taken up, and its effects eliminated.

(d) The reduction in the load on working parts permits of a reduction in size of the parts and so enables a smaller hub diameter to be used with the consequent improvement in propulsive efficiency.

Figure 2:
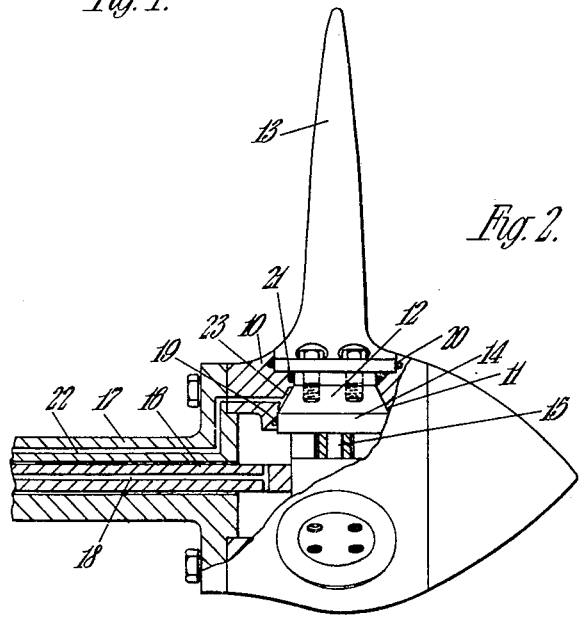

The accompanying drawings show by way of example only two embodiments of the invention in which:

Figure 1 is a section of a propeller having fluid pressure operated means for locking the blades, while Figure 2 is a section of a propeller having fluid pressure operated means for disengaging the locking of the blades as well as for locking the blades.

The boss or hub 10 of the propeller has formed in it conical bearings 11 which accommodate journals 12 formed on or attached to the roots of the propeller blades 13. The journals are made with an exactly similar cone angle to that of the bearings so that they mate exactly. The inner flanges 14 of the journals 12 carry crankpins 15 to which are applied the operating forces for turning the blades. In this embodiment this operating force is applied by means of push and pull rod 16 housed in the hollow propeller shaft 17.

Fluid under pressure is introduced into the interior of the boss via bore 18 in the operating rod 16 or alternatively through the space between the operating rod and the shaft. This pressure acts on the root of the blade forcing it radially outward and so producing a wedging action between the conical blade journal and its bearing in the boss. The blade is thus held very rigidly in relation to the boss and consequently cannot rock or twist.

The conical angle and the materials used are chosen so that the two tapers are not self locking, consequently the blades are free to be turned when the pressure in the hub is released.

The intimate contact between the conical journal and its bearing forms a very effective seal. When the pressure is first applied however, after turning the blades this contact has not been established. Seals 19 and 20 are fitted to prevent leakage of the pressure fluid under these conditions.

The total locking load derived from 25 square inches effective internal area for each blade for example, working with a fluid pressure of 200 lbs. per square inch is approximately 2 tons for each blade which is more than sufficient to carry the entire load to which each blade is subjected. It will be noted that there is no need to drop engine revolutions during the operation of a controllable pitch propeller equipped with the device which is the subject of this invention. The sequence of operations is (1) remove the locking fluid pressure (2) alter the propeller pitch by means of the actuating mechanism (3) restore the locking fluid pressure.

In certain cases such as where the speed of rotation and the mass of the blades are high, the centrifugal force may be sufficient to cause a partial locking of the blades. While this assists the locking of the blades in normal operation, it adds considerably to the force necessary to turn the blades. In such cases, I balance the centrifugal force by pressure applied to the conical part of the blade journal.

Fig. 2 illustrates this embodiment in which the smallest diameter of the blade journal is made parallel for a short length and an additional seal 21 is fitted. In other words, the faces are made parallel at the top of the truncated cone to accommodate the seal 21, and thereby prevent the escape of pressure oil. It will be noted that the seals 19, 20 and 21 are positioned as parallel, and not converging faces, since the same is a more effective means of making oil tight joints. Fluid pressure is applied via channel 22 in the shaft and propeller boss to a distribution groove 23 formed in the conical bore of the boss. This pressure acting over an effective area equal to the difference in the areas enclosed by seals 19 and 21 respectively produces a force which acts radially inward and so opposes the centrifugal force.

The area over which the balancing pressure operates is much less than that one which the locking pressure operates. In consequence, it can be left on when the blade is locked or alternatively applied only when it is desired to turn the blade.

In the embodiment shown in Fig. 2, the fluid pressure is applied direct to the journal surfaces. In this case, I prefer the fluid to be an oil with suitable lubricating qualities.

It is to be understood that the above description is by way of example only and that details for carrying the invention into effect may be varied without departing from the scope of the invention claimed.

I claim:

1. In a variable pitch propeller for marine vessels, a hub, at least one blade having a root mounted for rotation in said hub, and immobilizing means to prevent unintentional movement of said blade relative to the hub, said immobilizing means including a friction brake member in said hub, a friction brake member on said root, and means to introduce fluid under pressure into the hub to force said members into braking engagement.

2. An immobilizing means as claimed in claim 1 in which said brake members each have interengaging conical surfaces.

3. An immobilizing means as claimed in claim 2 in which the conical surface of the root and the conical surface of the hub constitute the journal and bearing respectively for the rotation of the blade when fluid pressure is relieved in the hub.

4. In a variable pitch propeller for marine vessels, a hollow hub, blades having a root end rotatably mounted in the hollow hub about axes at least perpendicular to the longitudinal axis of the hub, and immobilizing means to prevent unintentional rotation of the blades relative to said hub, said immobilizing means including a truncated conical surface on the root end of each blade, the hub having apertures therein with similar truncated conical surfaces, there being one aperture for each blade, with said surfaces constituting frictional brake components and the surfaces of the root ends and the apertures also defining the journals and bearings for the blades, the apices formed by the projection of said truncated conical surfaces being farther from the axis of rotation of the propeller than said brake components, said conical surfaces of said blade root ends being capable of limited radial movement respecting the conical surfaces of the apertures, and means to introduce fluid under pressure into the hollow hub to move said root ends radially outward whereby the conical surfaces of the root ends and the apertures coact to prevent rotation of the blades.

5. An immobilizing means as claimed in claim 2, further including means for applying fluid under pressure to said brake members to disengage said members when fluid pressure is relieved in the hub.

6. An immobilizing means as claimed in claim 4 in which the conical surface of each aperture is provided with a groove, and means for introducing fluid under pressure into said grooves to move said root ends radially inward to disengage the brake components when fluid pressure is relieved in the hollow hub.

7. In a variable pitch propeller for marine vessels, a hub, blades having a root end rotatably mounted in the hub about axes at least perpendicular to the longitudinal axis of the hub, and immobilizing means to prevent unintentional rotation of the blades relative to the hub, said immobilizing means including bearing means in the hub for each root end, journal means on each root end with said journal means being mounted in the bearing means for limited radial movement thereto, means defining a fluid receiving chamber within said hub communicating with said journal means, and means to introduce fluid under pressure into the fluid receiving chamber to move said journal means radially whereby said journal means and bearing means coact to prevent the rotation of the blades in the hub.

References Cited in the file of this patent

UNITED STATES PATENTS

| | | |
|---|---|---|
| 1,846,488 | Jackson | Feb. 23, 1932 |
| 1,846,600 | Kucera et al. | Feb. 23, 1932 |
| 1,867,715 | Seidel | July 19, 1932 |
| 1,891,272 | Slonimsky | Dec. 20, 1932 |
| 2,319,335 | Martinotti | May 18, 1943 |
| 2,433,990 | Hardy | Jan. 6, 1948 |
| 2,660,252 | Doussain | Nov. 24, 1953 |

FOREIGN PATENTS

| | | |
|---|---|---|
| 671,693 | Germany | Feb. 11, 1939 |
| 769,152 | France | June 5, 1934 |